Jan. 28, 1941.   F. C. EDWARDS   2,229,840
ROTATING CAB MACHINERY
Filed May 25, 1939   2 Sheets-Sheet 1
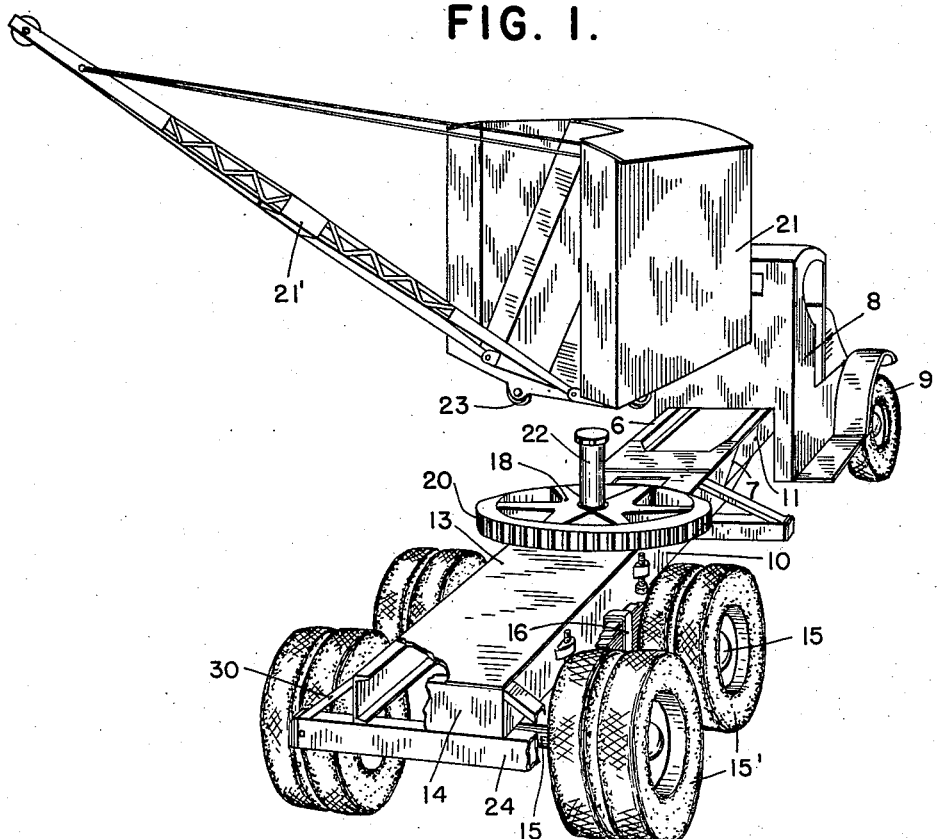
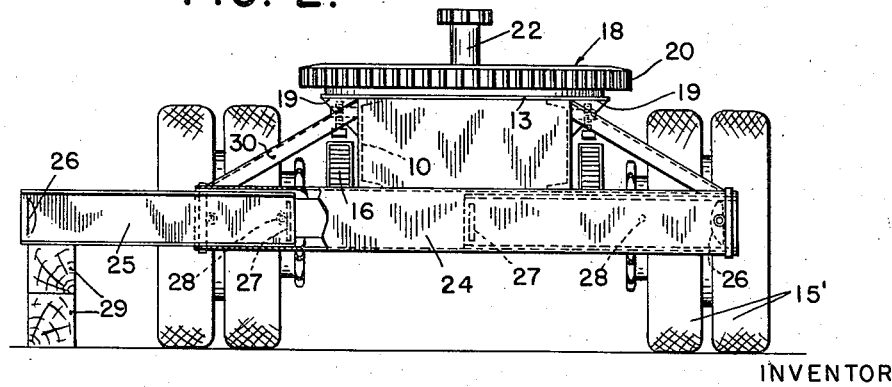
INVENTOR
Frank C. Edwards
BY
Quarles & French
ATTORNEYS INVENTOR
Frank C. Edwards
BY
Quarles & French
ATTORNEYS Patented Jan. 28, 1941

2,229,840

UNITED STATES PATENT OFFICE 2,229,840

ROTATING CAB MACHINERY

Frank C. Edwards, Englewood, N. J., assignor to Harnischfeger Corporation, Milwaukee, Wis., a corporation of Wisconsin Application May 25, 1939, Serial No. 275,578

4 Claims. (Cl. 212—69)

This invention relates to rotating cab cranes and excavating machinery.

Crawler type cranes and excavators are subject to a serious handicap in limited mobility. It has, therefore, become common to mount rotating cab hoisting and excavating machinery on wheeled vehicles of the automotive type. Machines thus assembled have a high mobility and may be moved wherever road surfaces permit at speeds far greater than the maximum speed of crawler type equipment. Such mobile machinery, however, has ordinarily been of light duty character, the size being limited by the strength of the frame of the usual heavy duty motor truck, which is of relatively light construction compared to the heavy duty machinery commonly employed for hoisting and excavating work.

In an attempt to increase the size of the machinery which may be employed in such mobile units, use has been made of auxiliary frames placed on top of the regular truck frames to increase the rigidity and to distribute the load over the length thereof. By such mounting, machinery of much greater weight and capacity may be utilized. Such assemblies, however, are seriously handicapped by the increase in height which this involves. Machinery of this type is often of such total height that even the few inches more added by the auxiliary frame may offer serious difficulties to the passing of bridges, elevated roadways, and other overhead structures. Moreover, even a slight increase of the height of the center of gravity may adversely affect the stability when the machine is tipped slightly from a horizontal plane, and thus the capacity, of the machinery under working conditions.

By the present invention both of these problems have been solved. A turntable base has been provided which is materially stronger than that offered by an ordinary truck frame, and at the same time the height of the base is no greater than when utilizing the ordinary motor truck frame. More particularly according to the present invention, a standard truck chassis has the rear portion of its frame or that portion back of the driver's cab cut off, and for the part so removed a frame of reinforced section together with solid top is substituted to which the axles and wheels and the spring mounting, if suitable, of the original truck are secured. The new frame thus produced is adapted to easily handle the rotating cab unit without increasing materially the over all height of the apparatus over what it would be were the original truck frame used, the frame also preferably having transverse hollow reinforcing beam sections formed integral therewith which also serve to carry outrigger frame members that aid in stabilizing the structure when in use.

The invention further consists in the several features hereinafter set forth and more particularly defined by claims at the conclusion hereof.

In the drawings:

Fig. 1 is a perspective view of an apparatus embodying the invention;

Fig. 2 is an end view of the apparatus embodying the invention;

Figure 3:
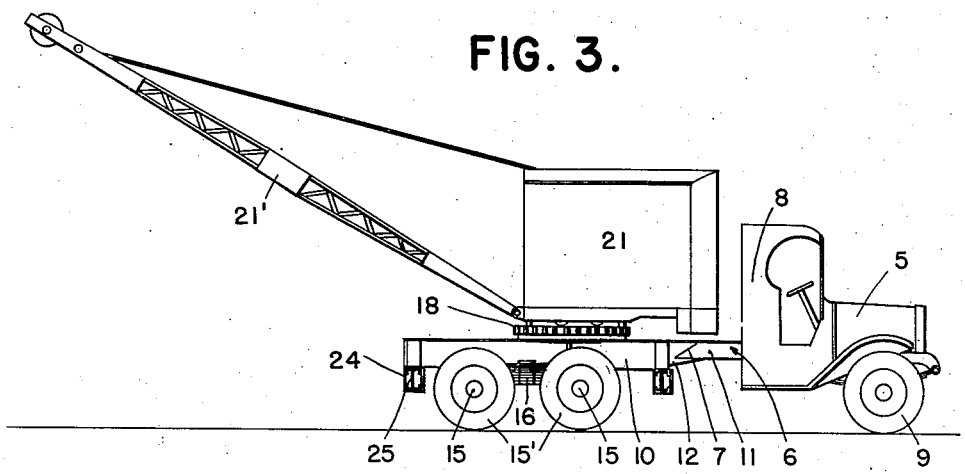
Fig. 3 is a side elevation view of the assembled apparatus.
Figure 4:
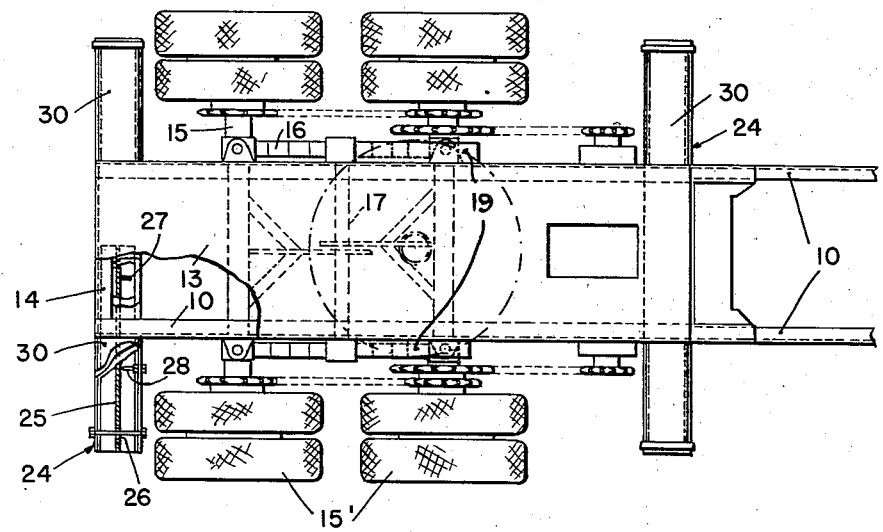
Fig. 4 is a plan view of the rear portion of the truck embodying the invention.

To form the frame structure for the mobile heavy duty machinery unit of the present invention, I take any suitable motor driven truck 5 of standard construction and cut off the rear portion of the frame 6 of this unit at a point back of the cab, the cut preferably being on an incline as noted at 7 in the drawings. This leaves the forward portion of the truck in its original condition with the operator's cab 8 and the front wheels 9, its propelling motor and the mountings therefor (not shown).

For the rear portion of the frame of the truck I substitute a frame having side members 10 of much deeper section than the side members 11 of the frame 6, and I connect these frame members 10 to the side members 11 by welding, it being noted that these side members 10 have tapered end portions 12 that extend beyond the ends of side members 11 and are welded to the bottom sides thereof. The new frame thus formed has a rear portion of very much greater strength than the original frame, and to further reinforce the same said rear portion is provided with a cover plate 13 which extends over the major portion of the rear part of the frame and is welded to the tops of the side frame members 10. A cross frame member 14 is secured to the back ends of the side bars 10. The wheel axles 15 carrying the wheels 15' of the original truck are suitably connected to springs 16 which are operatively connected to the truck frame through a tiltable shaft 17.

A turntable 18 is welded to the top covering or cover plate 13 and is further reinforced at the sides of the frame by the side brackets 19 welded to the side frames. This turntable 18 is provided with a peripheral gear portion 20 to engage with suitable swing mechanism, not shown, carried by the rotating cab 21 which is adapted to be mounted to rotate about the center pin or shaft 22 and is provided with rollers 23 that ride on the turntable 18.

The cab 21 is provided with the usual machinery (not shown) such as a power plant or engine and two or more hoist drums driven thereby for controlling the operations of a crane-boom 21', shovel, or ditcher attachment for said cab.

In order to brace the apparatus when in service and to further reinforce the frame I provide hollow transversely disposed outrigger beams 24 welded to the underside of the end portions of the reinforced frame portion, that is, one at the rear end and the other at a point in front of the turntable. Each of these beams 24 has I beams 25 slidably mounted therein and movable through opposite ends thereof, each of said beams 25 having a hand hole 26 and an angled projection 27 to engage a stop bolt 28 to limit the extent of outward movement of said beam 25 relative to the beam 24. When in extended position, the outer end of the extended beam 25 may be blocked up by the blocks 29 and thus act to brace this side of the vehicle against strains that may be imposed by the hoisting or digging apparatus carried by the cab 21. The beams 24 are also preferably braced by inclined brace members 30 welded at their ends respectively to said beams and to the side members 11.

By the construction above described there is produced a turntable of great strength and rigidity, able to carry a great weight while traveling, and which may be quickly braced to support an even greater load while at rest. With all this increase in load capacity, however, the turntable base is substantially no higher than the frame of the ordinary truck, on which it is mounted, so that substantially no increase is produced in the total height of the assembled unit.

I desire it to be understood that this invention is not to be limited to any particular form or arrangement of parts except in so far as such limitations are included in the claims.

What I claim as my invention is:

1. In rotating cab machinery, the combination with that portion of an automotive vehicle of relatively high mobility including the driver's seat and parts forwardly thereof including the side frame members, of a rear frame portion for said vehicle having side frame members of deeper section than those originally supplied with said vehicle and integrally secured to said original side members at the front portion of the vehicle to form a reinforced frame structure whose over all height is not materially greater than that of the original frame of the vehicle, reinforcing means for said rear frame portion, and a turntable mounted on the intermediate part of said rear frame portion.

2. In rotating cab machinery, the combination with that portion of an automotive vehicle of relatively high mobility including the driver's seat and parts forwardly thereof including the side frame members, of a rear frame portion for said vehicle having side frame members of deeper section than those originally supplied with said vehicle and integrally secured to said original side members at the front portion of the vehicle to form a reinforced frame structure whose over all height is not materially greater than that of the original frame of the vehicle, a top cover plate for said rear frame portion, and a turntable mounted on the intermediate part of said rear frame portion.

3. In rotating cab machinery, the combination with that portion of an automotive vehicle of relatively high mobility including the driver's seat and parts forwardly thereof including the side frame members, of a rear frame portion for said vehicle having side frame members of deeper section than those at the forward portion of said vehicle, the ends of said side frame members of deeper section being integrally secured to the rear ends of the side frame members of the front portion of the vehicle and having parts extending longitudinally of said ends, the over all height of the frame formed by said joined together frame members not being materially greater than that of the original frame of the vehicle, a cover plate connecting together the top of said side frame members of deeper section, and a turntable mounted on the intermediate part of said rear frame portion.

4. In rotating cab machinery, the combination with that portion of an automotive vehicle of relatively high mobility including the driver's seat and parts forwardly thereof including the side frame members, of a rear frame portion for said vehicle having side frame members of deeper section than those originally supplied with said vehicle and integrally secured to said original side members at the front of the vehicle to form a reinforced frame structure whose over all height is not materially greater than that of the original frame of the vehicle, a top cover plate for said rear frame portion, transversely disposed outrigger beams integrally secured to the underpart of said rear frame portion at the front and rear thereof, and a turntable mounted on the intermediate part of said rear portion.

FRANK C. EDWARDS.